United States Patent
Kawakami

(10) Patent No.: US 10,245,902 B2
(45) Date of Patent: Apr. 2, 2019

(54) PNEUMATIC TIRE

(75) Inventor: Kazuki Kawakami, Osaka (JP)

(73) Assignee: TOYO TIRE & RUBBER CO., LTD., Itami-shi (JP)

(*) Notice: Subject to any disclaimer, the term of this patent is extended or adjusted under 35 U.S.C. 154(b) by 911 days.

(21) Appl. No.: 14/345,430

(22) PCT Filed: Aug. 21, 2012

(86) PCT No.: PCT/JP2012/071083
§ 371 (c)(1),
(2), (4) Date: Sep. 4, 2014

(87) PCT Pub. No.: WO2013/065385
PCT Pub. Date: May 10, 2013

(65) Prior Publication Data
US 2014/0367008 A1 Dec. 18, 2014

(30) Foreign Application Priority Data
Nov. 2, 2011 (JP) ................................. 2011-241353

(51) Int. Cl.
*B60C 19/08* (2006.01)
*B60C 11/00* (2006.01)
*B60C 1/00* (2006.01)

(52) U.S. Cl.
CPC .......... *B60C 19/082* (2013.01); *B60C 1/0016* (2013.01); *B60C 11/0058* (2013.01); *Y02T 10/862* (2013.01)

(58) Field of Classification Search
CPC ............................. B60C 19/08; B60C 19/082
(Continued)

(56) References Cited

U.S. PATENT DOCUMENTS 6,070,630 A    6/2000  Pompei et al.
6,269,854 B1 * 8/2001  Matsuo .................. B60C 11/18
                                                        152/152.1
(Continued)

FOREIGN PATENT DOCUMENTS

EP    0819555 A1 *  1/1998  ............. B60C 19/08
GB    2058687 A  *  4/1981  ............... B60C 9/18
(Continued)

OTHER PUBLICATIONS

Machine Translation: JP 11227415 A; Kurokawa, Makoto; no date.*
(Continued)

*Primary Examiner* — Kendra Ly
(74) *Attorney, Agent, or Firm* — Westerman, Hattori, Daniels & Adrian, LLP

(57) ABSTRACT

An objective of the present invention is to provide a pneumatic tire whereby primarily rolling resistance is minimized and noise is minimized. This pneumatic tire tread rubber (5) comprises: a cap part (50) which is formed of non-conductive rubber and configures a grounding surface; a base part (51) which is disposed on the inner side of the cap part (50) in a tire radial direction (RD); and conductive parts (52) which are disposed in both of a pair of lateral end parts which are at ends of the cap part (50) in a tire width direction, traverse the inner part of the cap (50) while avoiding a location which covers the grounding surface, and form shapes which connect the grounding surface with the bottom surface (50*b*) of the cap part (50) in the tire meridian cross-section. The conductive parts (52) are provided with extended sites (52*b*) which branch off outward to the tire width direction (WD) from conductive paths (52*a*) which connect the grounding surface with the bottom surface (50*b*) of the cap part (50). The conductive parts (52) are formed of a conductive rubber which has different rubber hardness (Continued)

from the non-conductive rubber which forms the cap part (50).

5 Claims, 5 Drawing Sheets

(58) Field of Classification Search
USPC .......................................... 152/152.1, DIG. 2
See application file for complete search history.

(56) References Cited

U.S. PATENT DOCUMENTS

| | | | |
|---|---|---|---|
| 6,523,585 B1* | 2/2003 | Ducci | B60C 11/18 |
| | | | 152/152.1 |
| 2002/0185210 A1* | 12/2002 | Poulbot | B60C 19/08 |
| | | | 156/126 |
| 2008/0216929 A1 | 9/2008 | Mizutani | |
| 2009/0173419 A1* | 7/2009 | Kawakami | B29D 30/60 |
| | | | 152/152.1 |

FOREIGN PATENT DOCUMENTS

| | | | |
|---|---|---|---|
| JP | 9-30212 A | | 2/1997 |
| JP | 10-175403 A | | 6/1998 |
| JP | 10175403 A | | 6/1998 |
| JP | 11227415 A | * | 8/1999 |
| JP | 2004136808 A | * | 5/2004 |
| JP | 2007290485 A | | 8/2007 |
| JP | 2008-213364 A | | 9/2008 |
| JP | 2009-161070 A | | 7/2009 |
| JP | 2009161070 A | | 7/2009 |

OTHER PUBLICATIONS

Machine Translation: JP-2004136808-A; Azuma, Eiji; no date.*
Chinese Office Action dated Aug. 27, 2015, issued in counterpart CN Application. No. 201280046504.6, with English translation (14 pages).
German Office Action dated Sep. 16, 2015, issued in counterpart German patent Application. No. 112012004580.7, with English translation (13 pages).
Notification of Transmittal of Translation of the International Preliminary Report on Patentability (Form PCT/IB/338) of International Application No. PCT/JP2012/071083 dated May 15, 2014 with forms PCT/IB/373 and PCT/ISA/237 (7 pages).
International Search Report dated Nov. 27, 2012, issued in corresponding application No. PCT/JP2012/071083.

* cited by examiner

PNEUMATIC TIRE

TECHNICAL FIELD

The present invention relates to a pneumatic tire which can discharge a static electricity generated in a vehicle body or the tire to a road surface.

BACKGROUND ART

In recent years, for the purpose of reducing a tire rolling resistance having a deep relationship with a fuel consumption performance, there has been proposed a pneumatic tire in which a rubber member such as a tread rubber is formed of a non-conductive rubber blended with a silica at a high rate. However, the rubber member has a problem that a defect such as a radio noise tends to be generated since an electric resistance is higher in comparison with a conventional product which is blended with a carbon black at a high rate, thereby inhibiting the discharge of the static electricity generated in the vehicle body or the tire to the road surface.

Accordingly, there has been developed a pneumatic tire configured such that a current-applying performance can be achieved by arranging a conductive rubber blended with a carbon black while forming a tread rubber by a non-conductive rubber. In a pneumatic tire, for example, described in Patent Document 1, there is disclosed the tire in which a conductive path for discharging a static electricity is configured from a grounding surface of a tread rubber to a site reaching a tread end, by covering a pair of lateral end sites in both sides of the tread rubber in a tire width direction, the tread rubber being formed of a non-conductive rubber with a conductive rubber.

PRIOR ART DOCUMENT

Patent Document

Patent Document 1: JP-A-09-30212

SUMMARY OF THE INVENTION

Problems to be Solved by the Invention

However, in the tire having the structure mentioned above, since the conductive rubber which wears more easily in comparison with the non-conductive rubber covers the grounding surface in the vicinity of the grounding end so as to be in an exposed state to the surface, the vicinity of the grounding end wears more easily in comparison with an equator site (a center site) of a tread part, and an uneven wear such as a shoulder wear tends to be caused. Further, in this case, taking the wear into consideration, it is necessary to increase a volume of the conductive rubber, so that the rolling resistance is deteriorated. Further, it is preferable to arrange a rubber which is excellent in a crack resistance, in the surface near the grounding end, however, since the conductive rubber which is inferior in the crack resistance is arranged for securing a conductive path, in the structure, the crack resistance is deteriorated.

Further, in the tire, it is desirable to reduce the noise generated at the traveling time, for providing a comfortable riding quality. Since the noise is affected by a rigidity of the tread part in the tire, it is preferable to easily adjust the rigidity of the site.

The present invention is made by paying attention to the problem mentioned above, and an object of the present invention is to provide a pneumatic tire which mainly reduces a rolling resistance, and reduces a noise by easily adjusting a rigidity of a tread part.

Means for Solving the Problems

The present invention employs the following means for achieving the object. In other words, according to the present invention, there is provided a pneumatic tire including a pair of bead parts, a side wall part which extends to an outer side in a tire radial direction from each of the bead parts, a tread part which is connected to outer ends in the tire radial direction of the respective side wall parts, a toroidal carcass layer which is provided between the pair of bead parts, a side wall rubber which is provided in an outer side of the carcass layer in each of the side wall parts, and a tread rubber which is provided in an outer side of the carcass layer in the tread part, wherein the tread rubber includes: a cap part which is formed of a non-conductive rubber and constitutes a grounding surface, a base part which is provided in an inner side in the tire radial direction of the cap part, and a conductive part which is provided in at least one lateral end part of a pair of lateral end parts in both ends of the cap part in a tire width direction, and is formed so as to connect the grounding surface and a lateral end surface or a bottom surface of the cap part in a tire meridian cross section through an inner portion of the cap part while avoiding a position covering the grounding surface, and wherein the conductive part has an extended site which is branched from a conductive path connecting the grounding surface and the lateral end surface or the bottom surface of the cap part so as to extend to an outer side in the tire width direction, and is formed of a conductive rubber having a different rubber hardness from the non-conductive rubber forming the cap part.

As mentioned above, since the conductive part constituting the conductive path formed so as to connect the grounding surface and the lateral end surface or the bottom surface of the cap part passes through the inner portion of the cap part while avoiding the position covering the grounding surface, in the tire meridian cross section, it is possible to inhibit the conductive rubber which more easily wears in comparison with the non-conductive rubber from being exposed as the grounding surface to the surface, and it is possible to suppress the uneven wear such as the shoulder wear. Further, since the conductive rubber which is inferior in the crack resistance is configured so as to be retreated from the surface, it is possible to improve the crack resistance. Further, since the volume of the conductive rubber is suppressed while securing the conductive performance, it is also possible to improve the rolling performance.

For example, in the case where the lateral end site of the cap part is sectioned into the tire outer side and the tire inner side by the conductive rubber having the higher hardness than the hardness of the cap part, the rigidity of the lateral end site is enhanced in comparison with the case where the lateral end site is not sectioned, the cross section high order is suppressed, and the noise mainly in the high frequency area is reduced. On the other hand, in the case where the lateral end site of the cap part is sectioned into the tire outer side and the tire inner side by the conductive rubber having the lower hardness than the hardness of the cap part, the rigidity of the lateral end site becomes lower in comparison with the case where the lateral end site is not sectioned, a first order characteristic value is lowered, and the noise mainly in the low frequency area is reduced. Using this, the present invention has the conductive part having the extended site which extends to the outer side in the tire width direction, and thus the lateral end site of the cap part is sectioned into the tire inner and outer sides. Therefore, the rigidity of the lateral end site of the cap part can be set to a desired rigidity by being changed in comparison with the case where the conductive part is not provided, only by arranging the conductive part mentioned above, and the noise can be reduced through an appropriate rigidity setting.

Further, according to another aspect of the present invention, there can be listed up a pneumatic tire including a pair of bead parts, a side wall part which extends to an outer side in a tire radial direction from each of the bead parts, a tread part which is connected to outer ends in the tire radial direction of the respective side wall parts, a toroidal carcass layer which is provided between the pair of bead parts, a side wall rubber which is provided in an outer side of the carcass layer in each of the side wall part, and a tread rubber which is provided in an outer side of the carcass layer in the tread part, wherein the tread rubber includes: a cap part which is formed of a non-conductive rubber and constitutes a grounding surface, a base part which is provided in an inner side in the tire radial direction of the cap part, and a conductive part which is provided in at least one lateral end part of a pair of lateral end parts in both ends of the cap part in a tire width direction, and connects the grounding surface and a lateral end surface or a bottom surface of the cap part through an inner portion of the cap part while avoiding a position covering the grounding surface, and wherein the conductive part is formed by circumferentially arranging in a spiral manner a band-like conductive rubber having a different rubber hardness from the non-conductive rubber forming the cap part around a tire axis to a position which is exposed to the grounding surface from the lateral end surface or the bottom surface of the cap part, and a site which is exposed to the grounding surface and a site which reaches the lateral end surface or the bottom surface of the cap part are segmentalized by the non-conductive rubber forming the cap part, in a tire meridian cross section. According to the structure mentioned above, it is possible to produce the same action effect as the above.

In order to improve uniformity in the width direction (the lateral direction) of the tire, it is preferable that the conductive part is provided in each of one side in the tire width direction and the other side in the tire width direction. According to the structure, since the conductive rubber is arranged in a balanced manner in both sides in the tire width direction, and it is possible to improve a uniformity in the lateral direction of the tire.

MODE FOR CARRYING OUT THE INVENTION

A description will be given below of a pneumatic tire according to an embodiment of the present invention with reference to the accompanying drawings.

Figure 1:
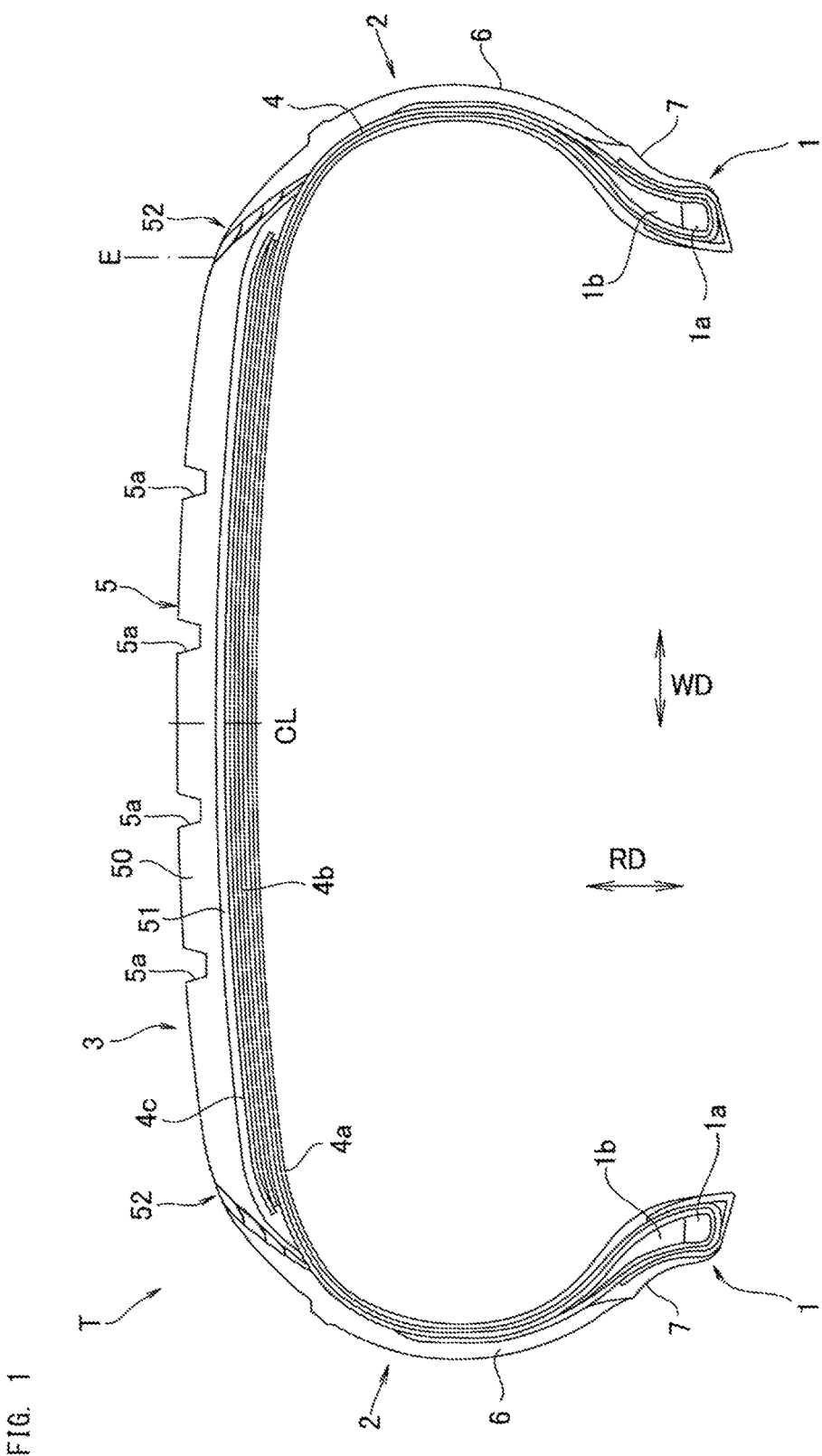
FIG. 1 is a tire meridian cross sectional view showing an example of a pneumatic tire according to the present invention.

As shown in FIG. 1, a pneumatic tire T is provided with a pair of bead portions 1, side wall portions 2 which extend to outer sides in a tire radial direction RD from the respective bead portions 1, and a tread portion 3 which is connected to outside ends in the tire radial direction RD from both the side wall portions 2. An annular bead core 1a and a bead filler 1b are arranged in the bead portion 1, the annular bead core 1a covering a convergence body such as a steel wire by a rubber, and the bead filler 1b being made of a hard rubber.

Further, the tire T is provided with a toroidal carcass layer 4 which runs into the bead portions 1 from the tread portion 3 via the side wall portions 2. The carcass layer 4 is provided between a pair of bead portions 1, is constructed by at least one carcass ply, and is locked in a state in which its end portions are rolled up via the bead cores 1a. The carcass ply is formed by coating with a topping rubber a cord which extends approximately vertically to a tire equator CL. An inner liner rubber 4a for retaining a pneumatic pressure is arranged in an inner side of the carcass layer 4.

Further, side wall rubbers 6 are provided in outer sides of the carcass layer 4 in the side wall portions 2. Further, rim strip rubbers 7 coming into contact with a rim (not shown) at a time of being installed to the rim are provided in the outer sides of the carcass layer 4 in the bead portions 1. In the present embodiment, the topping rubber of the carcass layer 4 and the rim strip rubber 7 are formed of a conductive rubber, and the side wall rubber 6 is formed of a non-conductive rubber.

An outer side of the carcass layer 4 in the tread portion 3 is provided with a belt 4b for reinforcing the carcass layer 4, a bet reinforcing member 4c and a tread rubber 5 in this order from an inner side toward an outer side. The belt 4b is constructed by a plurality of belt plies. The belt reinforcing member 4b is constructed by coating a cord extending in a tire peripheral direction with a topping rubber. The belt reinforcing member 4b may be omitted as occasion demands.

Figure 2:
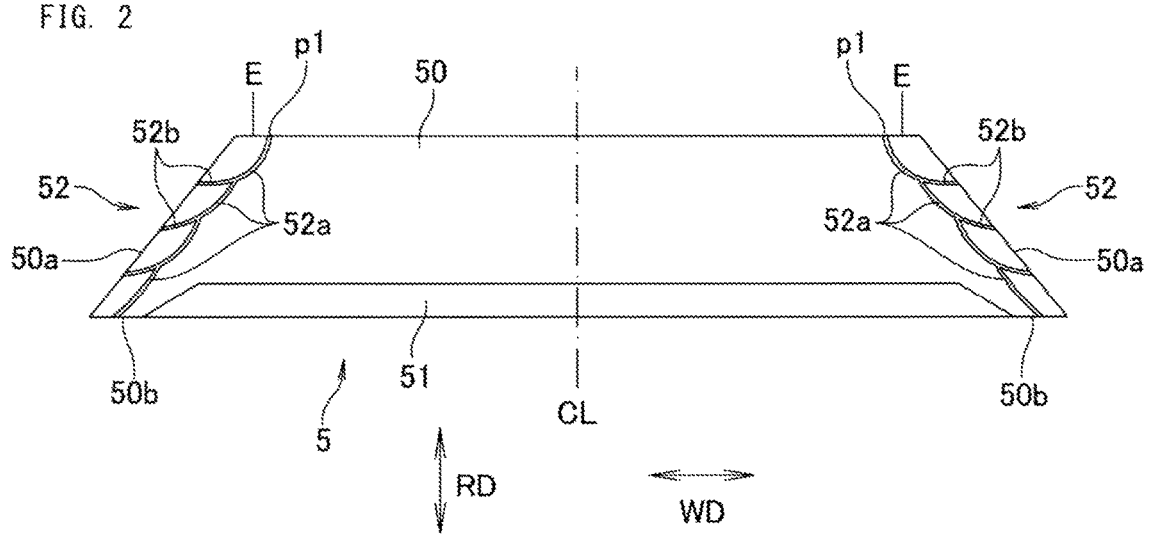
FIG. 2 is a cross sectional view schematically showing a tread rubber before being vulcanized.

As shown in FIGS. 1 and 2, the tread rubber 5 has a cap part 50 which is formed of the non-conductive rubber and constitutes a grounding surface, a base part 51 which is formed of the non-conductive rubber and is provided in an inner side in a tire radial direction of the cap part 50, and a conductive part 52 which is formed of the conductive rubber and reaches a lateral bottom surface 50b of the cap part 50 from the grounding surface. A plurality of main grooves 5a extending along a tire peripheral direction are formed on a surface of the tread rubber 5. In the present embodiment, the base part 51 is formed of the non-conductive rubber, however, may be formed of the conductive rubber.

In the above, the ground surface is a surface which is grounded onto a road surface when the tire is vertically put on a flat road surface in a state in which the tire is assembled in a normal rim, and a normal internal pressure is filled, and a normal load is applied to the tire, and an outermost position in the tire width direction WD comes to a ground end E. The normal load and the normal internal pressure indicate a maximum load (a design normal load in the case of a tire for a passenger car) which is defined in JISD4202 (specification of an automotive tire) and a corresponding pneumatic pressure, and the normal rim indicates a standard rim which is defined in JISD4202 in principle.

The present embodiment employs a side-on tread structure achieved by mounting the side wall rubbers 6 onto both side end portions of the tread rubber 5, however, can employ a tread-on side structure achieved by mounting both side end portions of the tread rubber onto outer ends in the tire radial direction RD of the side wall rubbers, without being limited to the side-on tread structure.

Here, the conductive rubber is exemplified by a rubber in which a volume resistivity indicates a value less than $10^8$ $\Omega \cdot cm$, and is produced, for example, by blending a carbon black serving as a reinforcing agent in a raw material rubber at a high rate. The conductive rubber can be obtained by blending a known conductivity applying agent, for example, a carbon-based conductivity applying agent such as a carbon fiber or a graphite, and a metal-based conductivity applying agent such as a metal powder, a metal oxide, a metal flake or a metal fiber, in addition to the carbon black.

Further, the non-conductive rubber is exemplified by a rubber in which a volume resistivity indicates a value equal to or more than $10^8$ $\Omega \cdot cm$, and is exemplified by a material obtained by blending a silica serving as a reinforcing agent in the raw material rubber at a high rate. The silica is blended, for example, at 30 to 100 weight part in relation to 100 weight part of the raw material rubber component. The silica preferably employs a wet silica, however, can use any silica which is generally used as the reinforcing agent, without limitation. The non-conductive rubber may be produced by blending a burned clay, a hard clay, or a calcium carbonate, in addition to the silica such as a precipitated silica or a silicic anhydride.

As the raw material rubber mentioned above, a natural rubber, a styrene butadiene rubber (SBR), a butadiene rubber (BR), an isoprene rubber (IR) and an isobutylene-isoprene rubber (IIR) can be listed up, and they are used respectively by itself or by mixing two or more kinds. A vulcanizing agent, a vulcanization accelerator, a plasticizer or an anti-oxidant is appropriately blended in the raw material rubber.

In the light of enhancing a durability and improving a conduction performance, the conductive rubber forming the conductive portion 52 desirably has a composition that a nitrogen adsorption specific surface area: $N_2SA$ $(m^2/g) \times$ composition amount (mass %) of carbon black is equal to or more than 1900, preferably equal to or more than 2000, and a dibutyl phthalate oil absorption: DBP (ml/100 g)×composition amount (mass %) of carbon black is equal to or more than 1500, preferably equal to or more than 1700. $N_2SA$ can be determined in conformity to ASTM D3037-89, and DBP can be determined in conformity to D2414-90.

FIG. 2 schematically shows the tread rubber 5 before being vulcanized. As shown in FIGS. 1 and 2, the conductive part 52 is provided in a pair of lateral end parts in both sides of the cap part 50 in the tire width direction, and is formed so as to connect the grounding surface and the lateral bottom surface 50b of the cap part 50 in the tire meridian cross section through the inner portion of the cap part 50 while avoiding the position covering the grounding surface. Specifically, the conductive part 52 has a conductive path 52a which extends in the tire radial direction and connects the grounding surface and the lateral bottom surface 50b of the cap part, and an extended site 52b which is branched from the conductive path 52a and extends to an outer side in the tire width direction. The conductive parts 52 are provided in one side and the other side in the tire width direction, and form a pair in right and left sides of a tire equator CL. In order to improve uniformity in a lateral direction of the tire, it is preferable that the conductive part 52 in one side in the tire width direction and the conductive part 52 in the other side in the tire width direction are set in a positional relationship that they are symmetrical about the tire equator CL.

As shown in FIG. 2, the conductive path 52a constituting the conductive part 52 passes through a downward area of a grounding end E from a grounding surface in an inner side in a tire width direction WD with respect to the grounding end E in a transverse cross section (also called as a tire meridian cross section) which is orthogonal to a tire peripheral direction, and reaches the lateral end surface 50a of the cap part 50. In the light of improvement of the rolling performance by reducing the volume of the conductive rubber, it is desirable that a site P1 at which an outer lateral end of the conductive path 52a in the tire radial direction is exposed to the grounding surface is within 30 mm from the grounding end E, more preferably within 15 mm. Further, it is desirable that the conductive part 52 is arranged in the outer side in the tire width direction with respect to the exposed site P1. Further, in order to improve the rolling resistance, it is preferable that in the inner side in the tire width direction WD with respect to the conductive path 52a, the conductive rubber is not arranged, but only the non-conductive rubber is arranged.

A plurality of extended sites 52b are provided along a tire radial direction RD, and are branched from the conductive path 52a so as to reach the lateral end surface 50a of the cap part 50 in the outer side in the tire width direction WD. It can be also said that a leading end of the extended site 52b comes into contact with the side wall rubber 6 in the lateral end surface 50a of the cap part 50.

The conductive part 52 is formed of a conductive rubber having a different hardness from the rubber hardness of the cap part 50. For example, in the case where the rubber hardness of the conductive part 52 is made higher than the rubber hardness of the cap part 50, the rigidity of the lateral end site of the tread part 3 relatively increases with respect to that of the center site of the tread part 3. Accordingly, though a cross section high order is suppressed, a first order characteristic value becomes higher and a noise (vibration) is reduced mainly in a high frequency area (for example, 250 to 500 Hz). On the contrary, in the case where the rubber hardness of the conductive part 52 is made lower than the rubber hardness of the tread part 3, the rigidity of the lateral end site of the tread part 3 relatively decreases with respect to that of the center site of the tread part. Accordingly, the first order characteristic value decreases, and the noise is reduced mainly in a low frequency area (for example, 80 to 160 Hz). In order to obtain the effect mentioned above, a rubber hardness difference between the cap part 50 and the conductive part 52 may be set to 1 degree or more, and preferably the hardness difference is set to 3 degrees or more to obtain more effect. The rubber hardness here means a hardness measured in accordance with a durometer hardness test (type A) of JISK6253.

Accordingly, in the present embodiment, only by arranging the conductive part 52 mentioned above, it is possible to change the rigidity of the lateral end site of the tread part 3 so as to set the desired rigidity, in comparison with the case where the conductive part 52 is not provided, and it is possible to reduce the noise in the low frequency area or the high frequency area through an appropriate rigidity setting.

Further, since the conductive part 52 reaching the lateral bottom surface 50b of the cap part 50 from the grounding surface so as to form the conductive path passes through the inner portion of the cap part 50 while avoiding the position covering the grounding surface, it is possible to inhibit the conductive rubber which easily wears in comparison with the non-conductive rubber from being exposed as the grounding surface to the surface, and it is possible to suppress the uneven wear such as the shoulder wear. Further, since the conductive rubber which is inferior in the crack resistance is configured so as to retreat from the surface, it is also possible to improve the crack resistance.

Further, in the present embodiment, since the conductive part 52 is provided in both of one side in the tire width direction WD and the other side in the tire width direction WD, the conductive rubber is arranged in a balanced manner in both sides in the tire width direction WD, and it is possible to improve a uniformity in the width direction (the lateral direction) of the tire.

[Other Embodiments]

(1) In the present embodiment, the topping rubber of the carcass layer 4 and the rim strip rubber 7 are formed by the conductive rubber, and the side wall rubber 6 is formed by the non-conductive rubber, however, the topping rubber of the carcass, the rim strip rubber and the side wall rubber may be formed by the non-conductive rubber or may be formed by the conductive rubber, as long as the conductive route is constructed between the ground surface of the tread portion and the rim contact position in the rim strip rubber. The combination thereof can be appropriately changed.

(2) Further, the conductive path 52a is arranged so as to reach the lateral bottom surface 50b of the cap part 50 from the grounding surface, however, may be arranged so as to reach the downward lateral end surface 50a of the cap part 50 from the grounding surface. Further, in the present embodiment, a cap portion 50 is formed by the non-conductive rubber, however, may be formed by the conductive rubber.

(3) Further, in the present embodiment, the conductive part 52 is provided in a pair of lateral end parts in both sides in the tire width direction WD of the cap part 50, however, the conductive part may be provided only in one lateral end part. In this case, it is preferably provided in a side which is easily grounded in correspondence to a camber at the time of attaching the tire to the vehicle body. Generally, it is preferable that the conductive part is provided in the lateral end part which is positioned in the inner side of the vehicle body in an attached state to the vehicle body.

Figure 3:
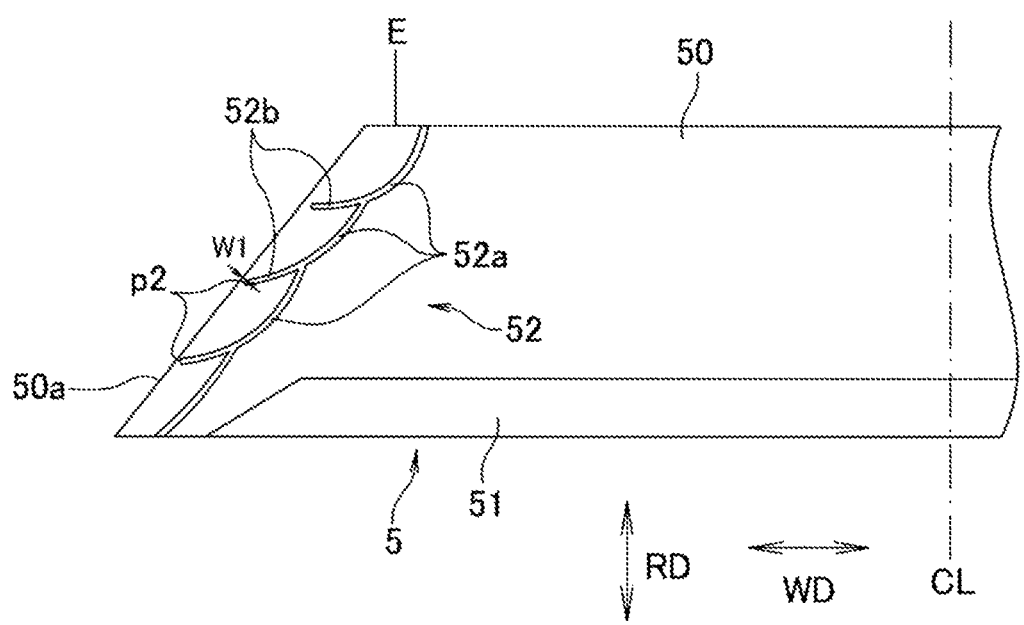
FIG. 3 is a cross sectional view schematically showing a tread rubber before being vulcanized according to another embodiment of the present invention.

(4) Further, in the present embodiment, as shown in FIGS. 1 and 2, the extended site 52b reaches the lateral end surface 50a of the cap part 50, however, as shown in FIG. 3, the leading end P1 of the extended site 52b may be terminated at the inner portion of the cap part 50 without reaching the lateral end surface 50a of the cap part 50. In this case, in order to achieve the effect of reducing the noise, a distance W1 between the leading end P2 of the extended site 52b and the lateral end surface 50a is preferably equal to or less than 15 mm, more preferably equal to or less than 5 mm.

Figure 4:
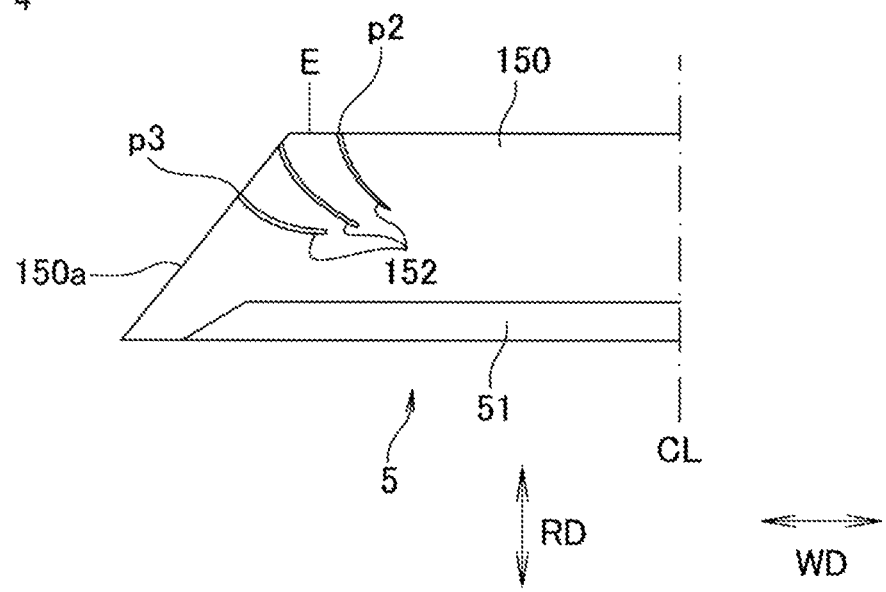
FIG. 4 is a cross sectional view schematically showing a tread rubber before being vulcanized according to the other embodiment than the above of the present invention.

(5) Further, in the present embodiment, the conductive part 52 is formed so as to connect the grounding surface and the bottom surface 50b of the cap part 50 in the tire meridian cross section, however, may be formed into a shape shown in FIG. 4. In other words, as shown in FIG. 4, a conductive part 152 is configured so as to connect the grounding surface and a lateral end surface 150a of a cap part 150 through an inner portion of the cap part 150 while avoiding a position covering the grounding surface, and is obtained by circumferentially arranging in a spiral manner a band-like conductive rubber having a different rubber hardness from a non-conductive rubber forming the cap part 150 from the lateral end surface 150a of the cap part 150 to a position which is exposed to the grounding surface about a tire axis, and a site P2 which is exposed to the grounding surface and a site P3 which reaches the lateral end surface 150a of the cap part 150 are segmentalized by the non-conductive rubber forming the cap part 150, in the tire meridian cross section. Here, there is exemplified the case where the side wall rubber 6 is the conductive rubber, however, in the case where the side wall rubber is the non-conductive rubber, the conductive part may be formed by being circumferentially arranged in a spiral manner from the bottom surface of the cap part to the position which is exposed to the grounding surface.

Figure 5:
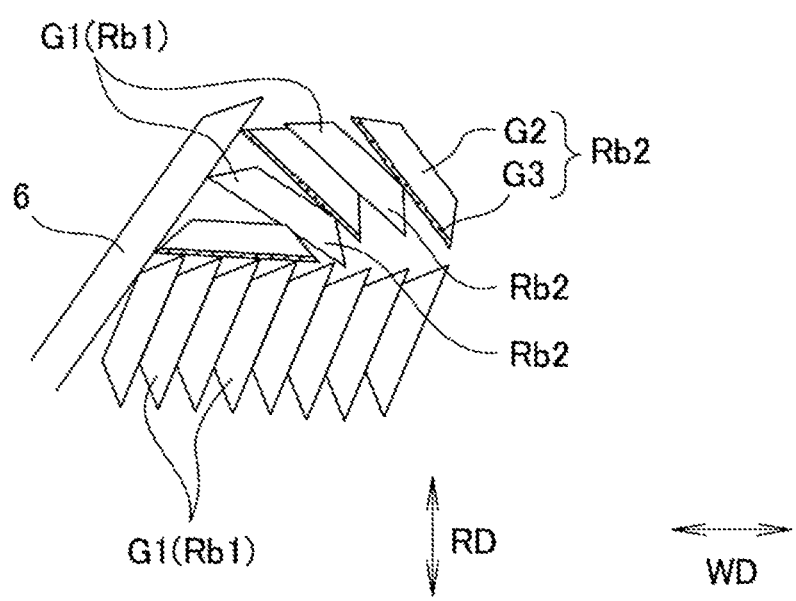
FIG. 5 is a schematically explanatory view relating to a method of manufacturing the tread rubber shown in FIG. 4.

The cap part 150 and the conductive part 152 mentioned above are manufactured as follows. They are manufactured by two shot molding using two rubber extrusion machines, in which one extrusion machine extrudes a first ribbon Rb1 formed only of a non-conductive rubber G1, as shown in FIG. 5 and the other extrusion machine is a dual extrusion machine extruding a band-like non-conductive rubber G2 and a second ribbon Rb2 of a conductive rubber G3 covering one surface of the non-conductive rubber G2, as shown in FIG. 5. Further, the cap part 150 is formed of the non-conductive rubbers G1 and G2 by alternately winding the first ribbon Rb1 and the second ribbon Rb2, and the conductive part 152 is formed of the conductive rubber G3. According to the manufacturing method mentioned above, it is possible to easily form the conductive part 152.

The structure mentioned above can achieve the same effect as the present embodiment. Further, since the band-like conductive rubber has a length in the tire width direction, a part of the tire lateral end site is sectioned into the outer and inner sides of the tire by the conductive rubber having the different rubber hardness from the cap part 150. Therefore, in the same manner as the present embodiment, only by arranging the conductive part mentioned above, it is possible to change the rigidity of the lateral end site of the cap part so as to set to the desired rigidity, in comparison with the case where the conductive part is not provided, and it is possible to reduce the noise through the appropriate rigidity setting. Further, in the conductive part 152, since the site P2 exposing to the grounding surface and the site P3 reaching the lateral end surface 150a of the cap part 150 are segmentalized by the non-conductive rubber forming the cap part 150, in the tire meridian cross section, the volume of the conductive rubber is suppressed, and it is possible to pursue a further rolling performance.

Figure 6A:
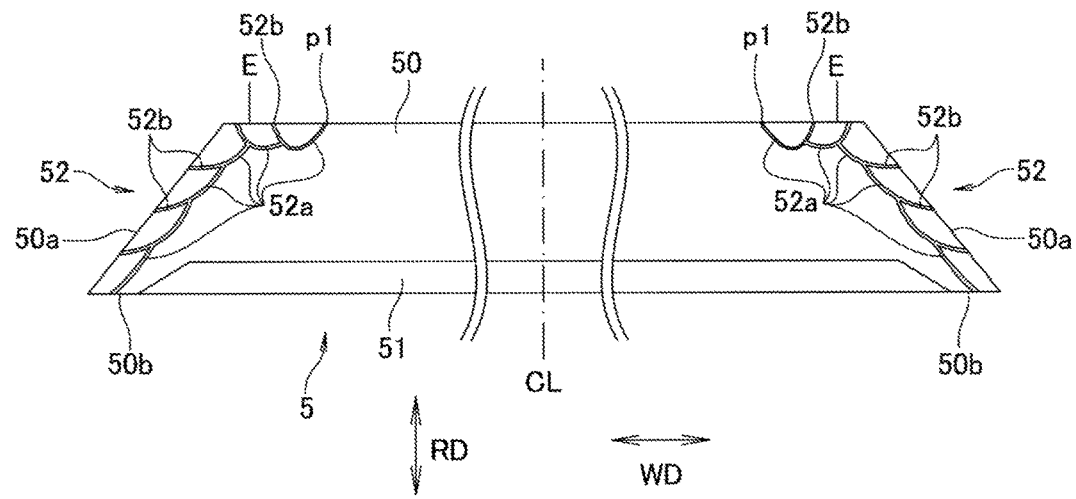
FIG. 6 is a cross sectional view schematically showing a tread rubber before being vulcanized according the other embodiment than the above of the present invention.
Figure 6B:
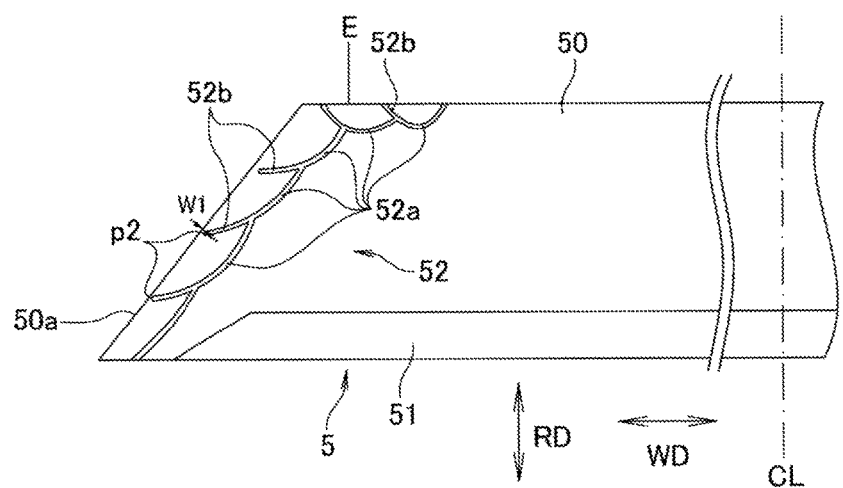
Figure 6C:
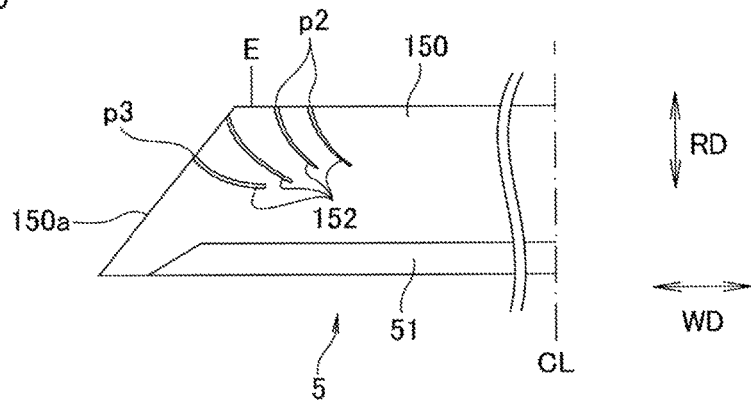

(6) In addition, in the embodiment mentioned above, the site P1 or P2 exposed to the grounding surface in the conductive part 52 or 152 is provided at one position, as shown in FIGS. 1 to 4, however, the conductive part 52 or 152 may be exposed at a plurality of positions of the grounding surface, as shown in FIGS. 6(a) to 6(c). With reference to FIGS. 6(a) and 6(b), it can be said that one or more extended site 52b is arranged in an inner side in the tire width direction WD with respect to the grounding end E. According to the structure mentioned above, it is more easily manufactured in comparison with the embodiment mentioned above. FIG. 6A shows a modified example corresponding to FIG. 2, FIG. 6B shows a modified example corresponding to FIG. 3, and FIG. 6C shows a modified example corresponding to FIG. 4.

EXAMPLES

In order to specifically show the structure and the effect of the present invention, the following evaluation were made about the following examples.

(1) Exciting Performance (Electric Resistance Value)

A predetermined load was applied to a tire which is installed to a rim, and an applied voltage (500 V) was applied to a metal plate on which the tire is grounded, from a shaft which supports the rim, whereby an electric resistance was measured.

(2) Rubber Hardness

A rubber composition was vulcanized for 30 minutes at 150° C., and a rubber hardness of the vulcanized rubber at 23° C. was measured in accordance with JISK6253.

(3) Rolling Resistance

A rolling resistance was measured and evaluated by a rolling resistance tester. The evaluation was made by setting a result of a comparative example 1 to 100, and the greater numerical value indicates the more excellent rolling resistance.

(4) Uniformity

A lateral force variation (LFV) was measured on the basis of a testing method prescribed in JISD4233, and a uniformity of the tire was evaluated. Specifically, the tire having a pneumatic pressure 200 kPa was pressed to a rotary drum so that a load 640 N is loaded, and a fluctuation amount of a force in a tire lateral direction, generated in the case where the tire is rotated while keeping a distance between both the axes constant, was measured. The evaluation was made by setting a result of the comparative example 1 to 100, and the greater numerical value indicates the better uniformity in the lateral direction.

(5) Noise Level (Low Frequency Area and High Frequency Area)

A test tire was adjusted to a pneumatic pressure 200 kPa by using a standard rim, the same tire was installed to all the wheels of a domestic 2000 cc passenger car, and a noise was measured by a noise level meter under a steady traveling at 60 km/h. 80 to 160 Hz component in the measured noise was set to a noise in a low frequency area, and 250 to 500 Hz component in the measured noise was set to a noise in a high frequency area. The evaluation was made by setting a result of the comparative example 1 to 100, and the greater numerical value indicates the more reduction of the noise.

(6) Uneven Wear

The tire was installed to an actual car, and traveled on an open road for 12000 km. The tread part was compared by a ratio of a wear amount between the equator site (the center part) and the shoulder part (the vicinity of the grounding end) after traveling. The closer ratio to 1.0 indicates an even wear. The evaluation was made by setting the ratio of the comparative example 1 to 100, the smaller numerical value indicates the uneven wear in which the ratio is away from 1.0, and the greater numerical value indicates the even wear in which the ratio comes close to 1.0.

(7) Crack Resistance

The tire was irradiated with Ozone, and a magnitude and a depth of a generated crack was evaluated. The evaluation was made by setting a result of the comparative example 1 to 100, and the greater numerical value indicates the greater crack resistance.

Comparative Example 1

A tire having a size 195/65R15 was manufactured, in which a tread rubber was formed by arranging a conductive rubber at positions covering both lateral end sites of the cap part 50 of the non-conductive rubber.

Example 1

In relation to the tire according to the comparative example 1, the conductive part 52 was provided in the inner portions of both lateral wall sites of the cap part 50. The rubber hardness of the conductive part 52 was set to be lower than the rubber hardness of the cap part 50. The rest was set to the same as the tire according to the comparative example 1.

Example 2

The conductive part 52 was provided only in the lateral end part in the inner side of the vehicle body among a pair of lateral end parts in both sides of the cap part 50 in the tire width direction WD. The rest was set to the same as the example 1.

Example 3

The rubber hardness of the conductive part 52 was made higher than the rubber hardness of the cap part 50. The rest was set to the same as the example 1.

TABLE 1

| | Position of conductive part | Rubber hardness of cap part | Hardness of conductive rubber | Electric resistance (MΩ) | Rolling resistance | LFV | Low frequency noise level | High frequency noise level | Uneven wear | Crack resistance |
|---|---|---|---|---|---|---|---|---|---|---|
| Comparative Example 1 | Surface of lateral end part of cap part Both lateral end parts | 65 | 56 | 3 | 100 | 100 | 100 | 100 | 100 | 100 |
| Example 1 | Inner portion of lateral end part of cap part Both lateral end parts | 65 | 56 | 3 | 102 | 105 | 105 | 98 | 105 | 110 |
| Example 2 | Inner portion of lateral end part of cap part Only one lateral end part (inner side of vehicle body) | 65 | 56 | 3 | 103 | 100 | 103 | 99 | 98 | 105 |
| Example 3 | Inner portion of lateral end part of cap part | 56 | 65 | 3 | 103 | 105 | 98 | 105 | 105 | 110 |

TABLE 1-continued

| Position of conductive part | Rubber hardness of cap part | Hardness of conductive rubber | Electric resistance (MΩ) | Rolling resistance | LFV | Low frequency noise level | High frequency noise level | Uneven wear | Crack resistance |
|---|---|---|---|---|---|---|---|---|---|
| Both lateral end parts | | | | | | | | | |

From Table 1, it is understood that the rolling resistance is effectively reduced in the examples 1 to 3 in comparison with the comparative example 1.

With regard to the current-applying performance, it is understood that the current-applying performance is appropriately secured in the comparative example 1 and the examples 1 to 3.

Further, with regard to the uniformity, since the example 1 in which the conductive part 52 is provided in both lateral sites of the cap part 50 is better than the example 2 in which the conductive part 52 is provided only in one lateral end site of the cap part 50, it is understood that it is preferable to arrange the conductive part 52 in both sides in the tire width direction.

With regard to the noise, it is understood that the noise in the low frequency area is reduced in the example 1 in which the conductive part 52 having the lower hardness than the cap part 50 is provided, in comparison with the comparative example 1 in which the conductive part 52 is not provided in the cap part 50. In the same manner, it is understood that the noise in the high frequency area is reduced in the example 3 in which the conductive part 52 having the higher hardness than the cap part 50 is provided, in comparison with the comparative example 1.

DESCRIPTION OF REFERENCE SIGNS

1 bead part
2 side wall part
3 tread part
4 carcass layer
6 side wall rubber
5 tread rubber
50 cap part
50a lateral end surface of cap part
50b bottom surface of cap part
51 base part
52, 152 conductive part
52a conductive path
52b extended site
RD tire radial direction
WD tire width direction

The invention claimed is:

1. A pneumatic tire comprising:
a pair of bead parts;
a side wall part which extends to an outer side in a tire radial direction from each of the bead parts;
a tread part which is connected to outer ends in the tire radial direction of the respective side wall parts;
a toroidal carcass layer which is provided between the pair of bead parts;
a side wall rubber which is provided in an outer side of the carcass layer in each of the side wall parts; and
a tread rubber which is provided in an outer side of the carcass layer in the tread part,
wherein the tread rubber includes:
a cap part which is formed of a non-conductive rubber and constitutes a grounding surface;
a base part which is provided in an inner side in the tire radial direction of the cap part; and
a conductive part which is provided in at least one lateral end part of a pair of lateral end parts in both ends of the cap part in a tire width direction, and is formed so as to connect the grounding surface and a lateral end surface or a bottom surface of the cap part in a tire meridian cross section through an inner portion of the cap part while avoiding a position covering the grounding surface,
wherein the conductive part has an extended site which is branched from a conductive path connecting the grounding surface and the lateral end surface or the bottom surface of the cap part so as to extend to reach the lateral end surface of the cap part in the tire width direction, and is formed of a conductive rubber having a different rubber hardness from the non-conductive rubber forming the cap part,
wherein the rubber hardness of the conductive rubber forming the conductive part is lower than the rubber hardness of the non-conductive rubber forming the cap part,
wherein the conductive path includes an exposed site at which an outer lateral end of the conductive path in the tire radial direction is exposed to the grounding surface, and the conductive part is provided in an outer side of the cap part in a tire width direction with respect to the exposed site, and
wherein the conductive part is not provided on an inner side of the conductive path in the tire width direction and only the non-conductive rubber is provided on the inner side of the conductive path in the tire width direction.

2. The pneumatic tire according to claim 1, wherein the conductive part is provided in each of one side in the tire width direction and the other side in the tire width direction.

3. A pneumatic tire comprising:
a pair of bead parts;
a side wall part which extends to an outer side in a tire radial direction from each of the bead parts;
a tread part which is connected to outer ends in the tire radial direction of the respective side wall parts;
a toroidal carcass layer which is provided between the pair of bead parts;
a side wall rubber which is provided in an outer side of the carcass layer in each of the side wall part; and
a tread rubber which is provided in an outer side of the carcass layer in the tread part,
wherein the tread rubber includes:
a cap part which is formed of a non-conductive rubber and constitutes a grounding surface;
a base part which is provided in an inner side in the tire radial direction of the cap part; and
a conductive part which is provided in at least one lateral end part of a pair of lateral end parts in both ends of the cap part in a tire width direction, and connects the grounding surface and a lateral end surface of the cap part, through an inner portion of the cap part while avoiding a position covering the grounding surface, wherein the conductive part is formed by circumferentially arranging in a spiral manner a band-like conductive rubber having a different rubber hardness from the non-conductive rubber forming the cap part around a tire axis to a position which is exposed to the grounding surface from the lateral end surface of the cap part, wherein the conductive part consists of at least one site which is exposed to the grounding surface and at least one site which reaches the lateral end surfaces of the cap part which are not connected to each other by conductive rubber and are divided by the non-conductive rubber forming the cap part, when viewed in a tire meridian cross section, and all of the sites of the conductive part are within 30 mm from a grounding end that is an outermost end of the grounding surface in the tire width direction, wherein the remaining cap part that is other than the conductive part is provided with only the non-conductive rubber, when viewed in the tire meridian cross section, and wherein the rubber hardness of the conductive rubber forming the conductive part is lower than the rubber hardness of the non-conductive forming the cap part.

4. The pneumatic tire according to claim 3, wherein the conductive part is provided in each of one side in the tire width direction and the other side in the tire width direction.

5. A pneumatic tire comprising:
a pair of bead parts;
a side wall part which extends to an outer side in a tire radial direction from each of the bead parts;
a tread part which is connected to outer ends in the tire radial direction of the respective side wall parts;
a toroidal carcass layer which is provided between the pair of bead parts;
a side wall rubber which is provided in an outer side of the carcass layer in each of the side wall parts; and
a tread rubber which is provided in an outer side of the carcass layer in the tread part, wherein the tread rubber includes:
a cap part which is formed of a non-conductive rubber and constitutes a grounding surface;
a base part which is provided in an inner side in the tire radial direction of the cap part; and
a conductive part which is provided in at least one lateral end part of a pair of lateral end parts in both ends of the cap part in a tire width direction, and is formed so as to connect the grounding surface and a lateral end surface or a bottom surface of the cap part in a tire meridian cross section through an inner portion of the cap part while avoiding a position covering the grounding surface, wherein the conductive part has an extended site which is branched from a conductive path connecting the grounding surface and the lateral end surface or the bottom surface of the cap part so as to extend to an outer side of the cap part in the tire width direction such that the extended site terminates in the non-conductive rubber of the cap part, and is formed of a conductive rubber having a different rubber hardness from the non-conductive rubber forming the cap part, wherein the rubber hardness of the conductive rubber forming the conductive part is lower than the rubber hardness of the non-conductive rubber forming the cap part, wherein the conductive path includes an exposed site at which an outer lateral end of the conductive path in the tire radial direction is exposed to the grounding surface, and the conductive part is provided in an outer side of the cap part in a tire width direction with respect to the exposed site, and wherein the conductive part is not provided on an inner side of the conductive path in the tire width direction and only the non-conductive rubber is provided on the inner side of the conductive path in the tire width direction.

* * * * *